United States Patent [19]

Siegel et al.

[11] Patent Number: 4,730,189

[45] Date of Patent: Mar. 8, 1988

[54] PULSE DOPPLER RADAR WITH VARIABLE PULSE REPETITION FREQUENCY

[75] Inventors: Harald Siegel, Gauting; Rudolf Hauptmann, Dachau, both of Fed. Rep. of Germany

[73] Assignee: Siemens Aktiengesellschaft, Berlin and Munich, Fed. Rep. of Germany

[21] Appl. No.: 613,261

[22] Filed: May 24, 1984

[30] Foreign Application Priority Data

Jun. 13, 1983 [DE] Fed. Rep. of Germany ....... 3321264

[51] Int. Cl.$^4$ ........................................... G01S 13/52
[52] U.S. Cl. .................................... 342/104; 342/137; 342/194; 342/162
[58] Field of Search .............. 343/5 CE, 5 CF, 5 DP, 343/5 FT, 5 L, 5 NQ, 7.7, 17.1 PF, 17.1 R; 342/104, 115, 131, 132, 134, 135, 137, 194, 195, 196, 197, 88–89, 159–163

[56] References Cited

U.S. PATENT DOCUMENTS 3,491,360  1/1970  Stoorvogel ................. 343/17.1 PF
3,855,593 12/1974  Van Hijfte et al. ..... 343/17.1 PF X
4,040,057  8/1977  Cross et al. ................. 343/17.1 PF
4,156,876  5/1979  Debuisser ........................ 343/5 DP

OTHER PUBLICATIONS

M. Skolnik, *Intro. to Radar Systems;* pp. 29–33; (McGraw-Hill, 1980).

*Primary Examiner*—T. H. Tubbesing
*Assistant Examiner*—Bernarr Earl Gregory
*Attorney, Agent, or Firm*—Hill, Van Santen, Steadman & Simpson

[57] ABSTRACT

A pulse Doppler radar system with variable pulse repetition frequency has a coherent integrator to which the reflected pulses are supplied in order to avoid deterioration of the indication of a moving target given over-the-horizon reception. The coherent integrator subjects the reflected pulses to a simplified vectorial addition by the use of a number of filters. A precondition for the modified coherent integration is a staggering of the pulse repetition periods such that their sums formed over successive pulse repetition periods are constant, and a phase reference for the signal amplitudes is obtained such that the phase difference is equal to zero after every second pulse repetition.

6 Claims, 7 Drawing Figures

$PRT_n = \overline{PRT} + (-1)^n \cdot \Delta T$ $PRT_{n+1} = \overline{PRT_1} + n \cdot (-1)^n \cdot \Delta T$ $$\frac{PRT_{n2} + PRT_{n2+1}}{2} = \overline{PRT_2} \; ; \; n = 1,3,5 \ldots$$

PULSE DOPPLER RADAR WITH VARIABLE PULSE REPETITION FREQUENCY

BACKGROUND OF THE INVENTION

1. Field of the Invention

The present invention relates to a pulse Doppler radar system having a variable pulse repetition frequency, and in particular to such a system having a means for vectorial integration of the reflected pulses.

2. Description of the Prior Art

In order to improve the detection probability of objects in flight, it is known to significantly increase the signal-to-noise ratio by means of integration of all of the reflected pulses received from the same target. Even small moving target signals can be detected by this measure in the superimposed noise. Summation of the successive reflected pulses from a target can be undertaken by a coherent integration before rectification, or by an incoherent integration of the video signals after rectification. Although coherent integration requires a greater circuit outlay, a better signal-to-noise ratio is obtained by this means.

If a pulse Doppler radar employs a fixed pulse repetition frequency, a vectorial addition of the individual reflected pulses in proper phase relation can be executed by means of a so-called comb filter. This repesents an optimum solution for detection of a moving target. In order to cover the entire Doppler frequency range, the number of filters required is equal to the number of integrated reflected pulses because of the comb structure.

In order to eliminate blind speed regions of a pulse Doppler radar system, it is also known to operate with changing pulse repetition frequencies. The use of a number of pulse repetition frequencies, however, results in the loss of the comb structure of the moving target filters. When the pulse Doppler radar operates with a statistical pulse repetition frequency, the entire Doppler frequency range of interest mast be covered by a large number of coherently integrating filters. Even though a quasi-statistical pulse repetition frequency is employed in practice, whereby the pulse periods of different lengths repeat after a concluded integration interval, filters must nonetheless be distributed over the entire range for which unambiguity is desired. The application of coherent integration in pulse Doppler radar with quasi-statistical pulse repetition frequency is not justifiable for economic reasons.

SUMMARY OF THE INVENTION

It is an object of the present invention to provide a pulse Doppler radar system which utilizes a plurality of pulse repetition frequencies with a filter outlay which is approximately the same as that for a system with a fixed pulse repetition frequecy.

The above object is inventively achieved in a pulse Doppler radar system wherein the mean value of the frequencies of pairs of pulse repetition frequencies formed from successive values is constant, and wherein the indicator reference for the reflected pulses, required because of the change in the pulse repetition frequency, is a constant value because the phase condition for execution of coherent integration is met after every second pulse repetition frequency.

In the system disclosed herein, the individual reflected pulses are multiplied by a value $e^{-j\omega_0 \cdot n \cdot \overline{PRT}}$ and thus are supplied with a constant backing or reference of the phases of the reflected pulses before integration given corresponding staggering of the pulse repetition frequency. In this expression, $\omega_0$ is the center frequency for the filter, n indicates the nth reflected pulse, and $\overline{PRT}$ indicates the mean period duration of the transmission pulse sequence.

Despite the staggered pulse repetition frequency, the Doppler frequency 0 Hz is treated in this manner as though the filter were being operated with a constant pulse repetition frequency. The moving target indication is also fully retained, because the range around 0 Hz is maintained free of minor lobes at all filters.

In a further embodiment of the invention, the staggering of the periods of the successive transmission pulses can be dimensioned according to the relationship $n \cdot (\overline{PRT} + (-1)^n \cdot \Delta T)$ or according to the relationship $n \cdot (\overline{PRT}_1 + n \cdot (-1)^n \cdot \Delta T)$. In these expressions, n and $\overline{PRT}$ are as defined above and $\overline{PRT}_1$ indicates a constant period duration for the transmission pulses, and $\Delta T$ indicates a constant fraction of the period duration. Given such a dimensioning of the pulse repetition periods, wherein the sum of two successive pulse repetition periods produces a value which remains constant for all pairs, a comb-like transfer function arises in the filters. This comb-like transfer function becomes more regular as the staggering of the pulse repetition times becomes more ordered.

DESCRIPTION OF THE PREFERRED EMBODIMENTS

Figure 1:
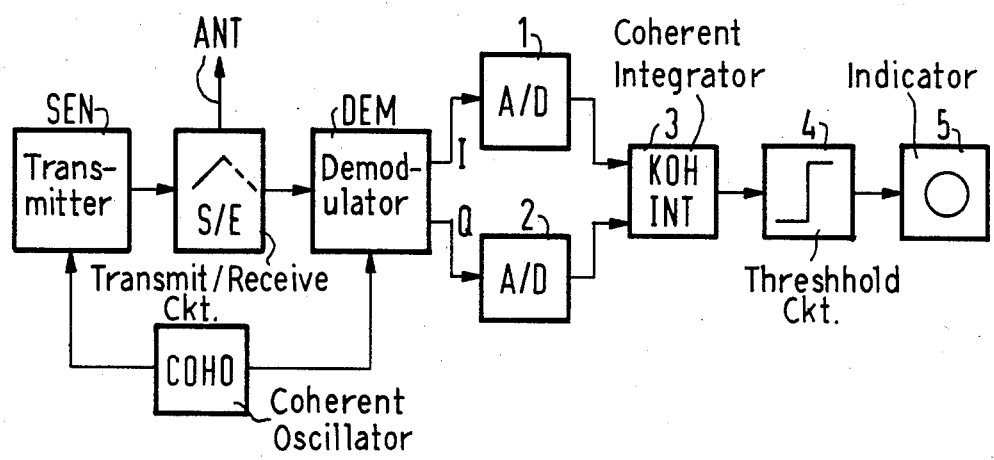
FIG. 1 is a block circuit diagram for the signal processing portion of a pulse Doppler radar with vectorial integration constructed in accordance with the principles of the present invention.

The signal processing portion of a pulse Doppler radar system constructed in accordance with the principles of the present invention is shown in FIG. 1. The system has a transmitter SEN connected to a transmit/receive circuit S/E having an antenna ANT. A demodulator DEM is connected to the transmit/receive S/E, and a coherent oscillator COHO is connected to each of the transmitter SEN and the demodulator DEM.

The two outputs I and Q of the demodulator DEM are connected to analog-to-digital converters 1 and 2 for converting the video signals into digital form. The further stages of the processing branch of the receiver include a coherent integrator 3 for vectorial integration, a threshold circuit 4, and an indicator means 5. A modified coherent integration of the reflected pulses is undertaken by the integration circuit 3 in order to considerably reduce the filter outlay which would otherwise be required for conducting coherent integration in a pulse Doppler radar having variable pulse repetition frequency. The preconditions for executing a modified coherent integration are a specific staggering of the pulse repetition frequency, and a phase backing or reference for the signal voltages which has a predetermined constant value. Optimum target detection is guaranteed as a result of the modified coherent integration. The reflected pulses of a range window are vectorially added over a plurality of reception periods. Over-the-horizon clutter can be largely supressed by this measure when the mean power of the over-the-horizon echos is distributed to a plurality of range windows. The desired effect can be achieved by means of a specific staggering of the pulse repetition frequency. When the different pulse repetition periods are thereby statistically connected to each other, a considerable number of coherent filters is required in conventional means for undertaking coherent integration in order to cover the entire Doppler frequency range of interest. The system disclosed and claimed herein considerably reduces the outlay for undertaking modified coherent integration, and over-the-horizon echos can be spectrally distinguished from the moving targets within the range of unambiguity with a small number of filters. The underlying effect of such an arrangement is that of obtaining a comb-like filter structure even given a quasi-statistical pulse-repetition frequency. The transfer function of the filter becomes more regular as the staggering of the pulse repetition frequencies becomes more ordered.

Figure 2:
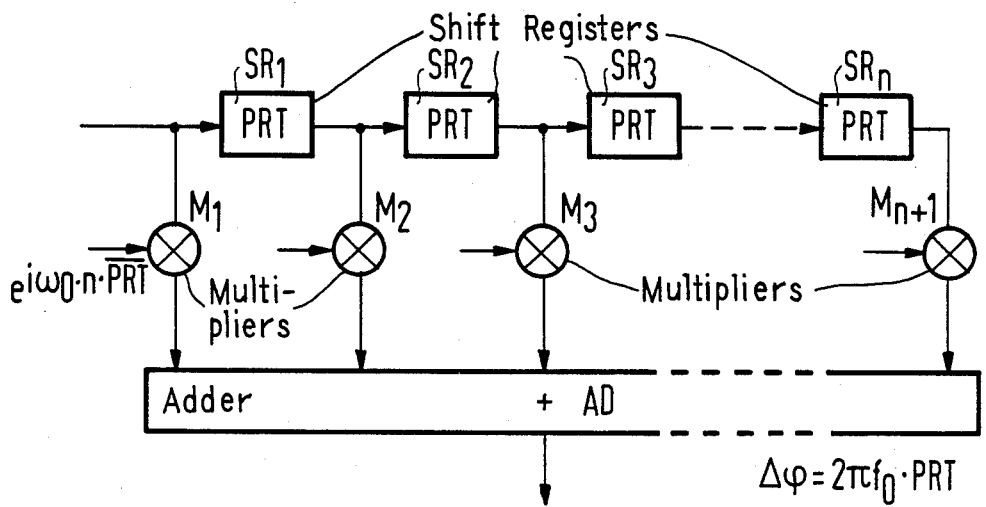
FIG. 2 is a block circuit diagram of a unit constructed in accordance with the principles of the present invention for undertaking vectorial integration for use in the coherent integrator shown in FIG. 1.

A schematic diagram for a circuit for undertaking a modified coherent integration of the reflected pulses is shown in FIG. 2 which is utilized in the coherent integrator 3 shown in FIG. 1. Digital signals are supplied at the input side of the circuit to a series connection of n shift registers $SR_1$ through $SR_n$. The number of shift registers corresponds to the number of signal values to be integrated. The signals are tapped before the input of each shift register and are supplied to respective multipliers $M_1$ $M_{n+1}$. The output of each multiplier is connected to a common adder AD. Each shift register $SR_1$ through $SR_n$ effects a delay corresponding to the pulse repetition period PRT of the radar means.

In order to undertake vectorial addition of the samples for coherent integration, a phase reference for the individual samples is required. This must normally be derived from the momentary pulse repetition time and the center filter frequency. In the modified coherent integration for the system disclosed and claimed herein, however, all signals tapped before the inputs of the shift registers $SR_1$ through $SR_n$ are multiplied by a weighting factor of $e^{-j \cdot \omega_0 \cdot n \cdot \overline{PRT}}$ in the multipliers $M_1$ through $M_{n+1}$. This weighting effects a constant phase reference for the samples so that the required phase condition for vectorial addition of the sample is restored after two phase reference steps. In the weighting factor, $\omega_0 = 2\pi f_0$, where $f_0$ is the center filter frequency. As described above, n in the expression is the number of samples and $\overline{PRT}$ is the mean period duration for the pulse repetition frequency.

Figure 3:
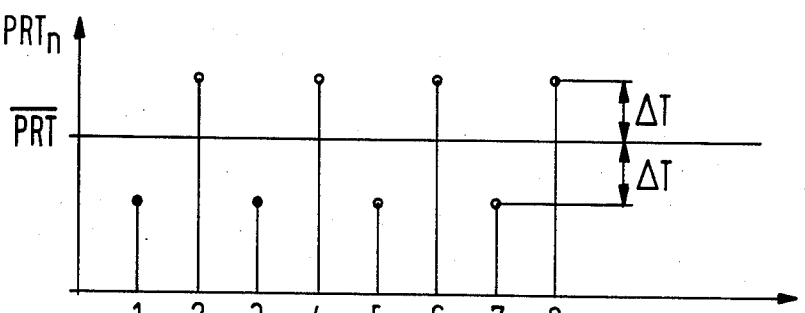
FIG. 3, FIG. 4 and FIG. 5 are graphic representations of different examples of staggerings of the pulse repetition period for the system shown in FIG. 1.
Figure 4:
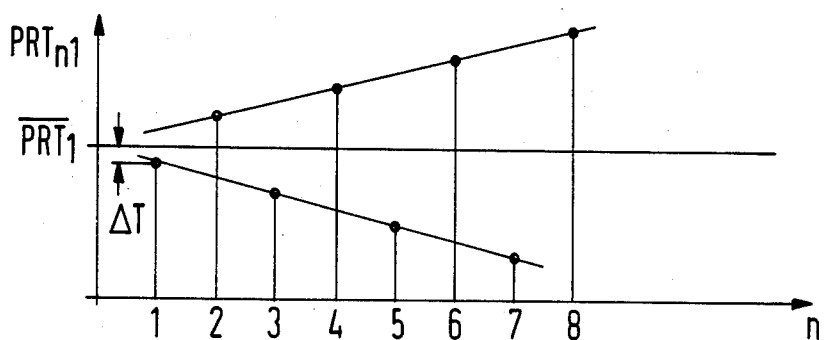
Figure 5:
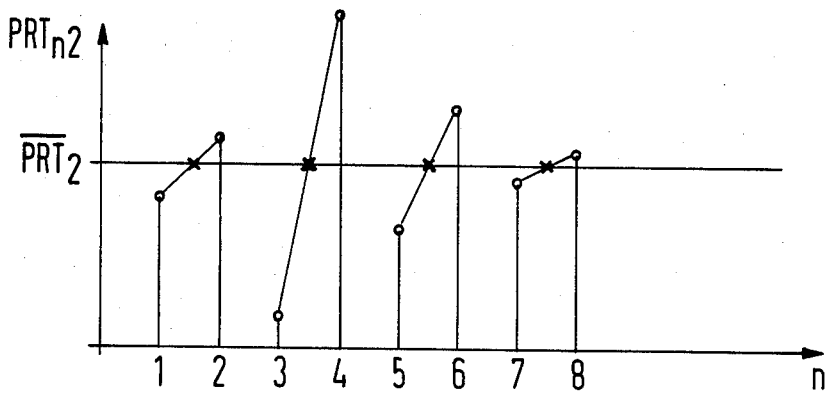

In order to obtain a comb-like filter transfer function in the integration circuit, even given a quasi-statistical pulse repetition frequency, the staggering of the pulse repetition times is selected such that the respective sums of two successive pulse repetition times produces a value which remains constant for all pairs of successive pulses. Examples of staggerings of the pulse repetition periods are shown in FIGS. 3 through 5 based on transfer functions calculated with modified coherent integration. FIG. 3 shows and example of staggering wherein two pulse repetition periods are employed which differ from the mean pulse repetition period $\overline{PRT}$ by a value $\Delta T$, and which can be determined according to the following equation:

$$PRT_n = \overline{PRT} + (-1)^n \cdot \Delta T.$$

A further example of PRT staggering is shown in FIG. 4 utilizing eight different pulse repetition periods with a linearly rising deviation from the mean pulse repetition period $\overline{PRT}$. These pulse repetition frequencies are calculated according to the equation:

$$PRT_{n1} = \overline{PRT_1} + n \cdot (-1)^n \cdot \Delta T.$$

Whereas the examples shown in FIGS. 3 and 4 have an ordered staggering, the examples shown in FIG. 5 is based on a completely statistical staggering, wherein there is no longer any pair-wise allocation of periods. The individual pulse repetition periods are calculated in the example shown in FIG. 5 according to the following equation:

$$\overline{PRT_2} = \frac{PRT_{n2} + PRT_{n2+1}}{2}, n = 1, 3, 5 \ldots$$

Figure 6:
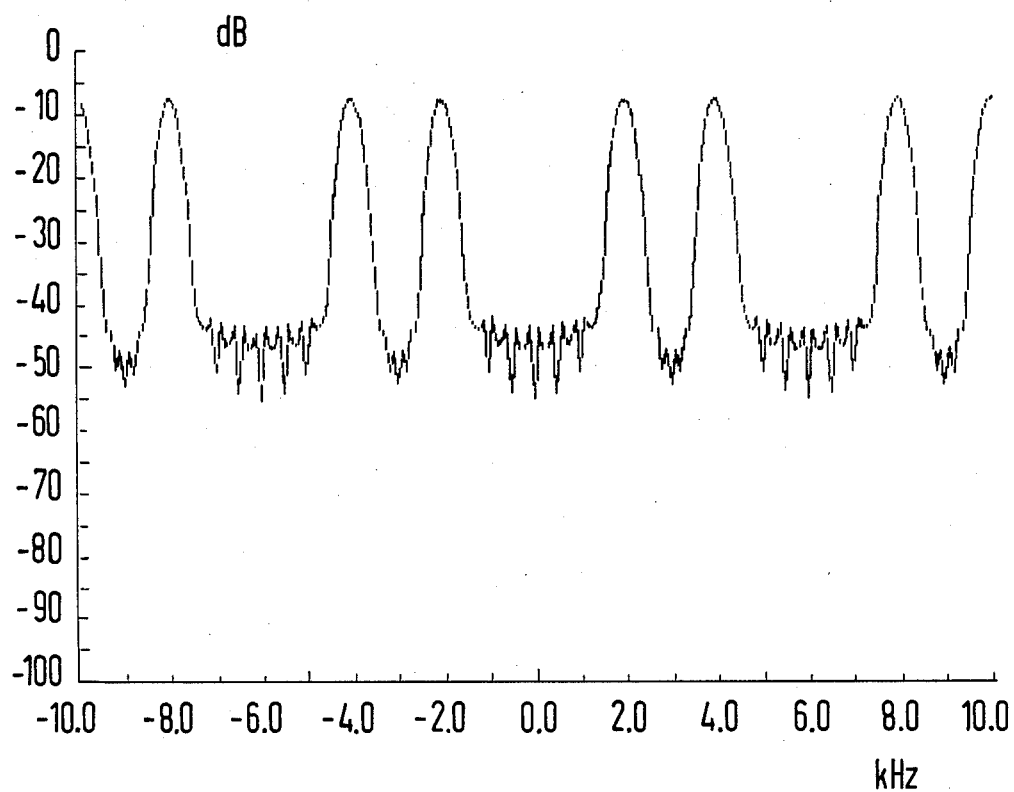
FIG. 6 and FIG. 7 show respective transfer functions for the integration circuit shown in FIGS. 1 and 2 for two different staggerings of the pulse repetition period.
Figure 6:
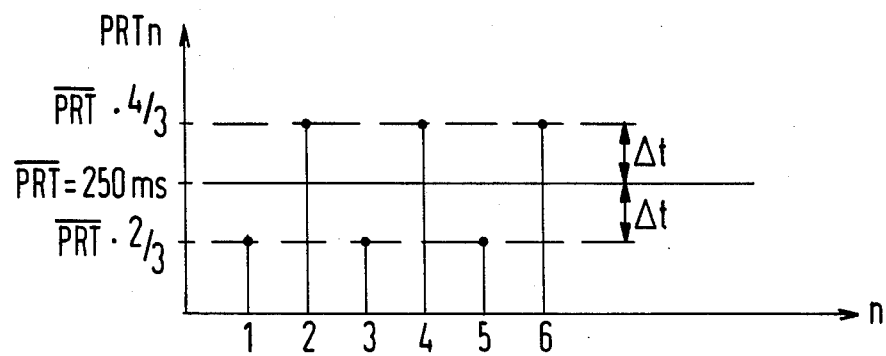
Figure 7:
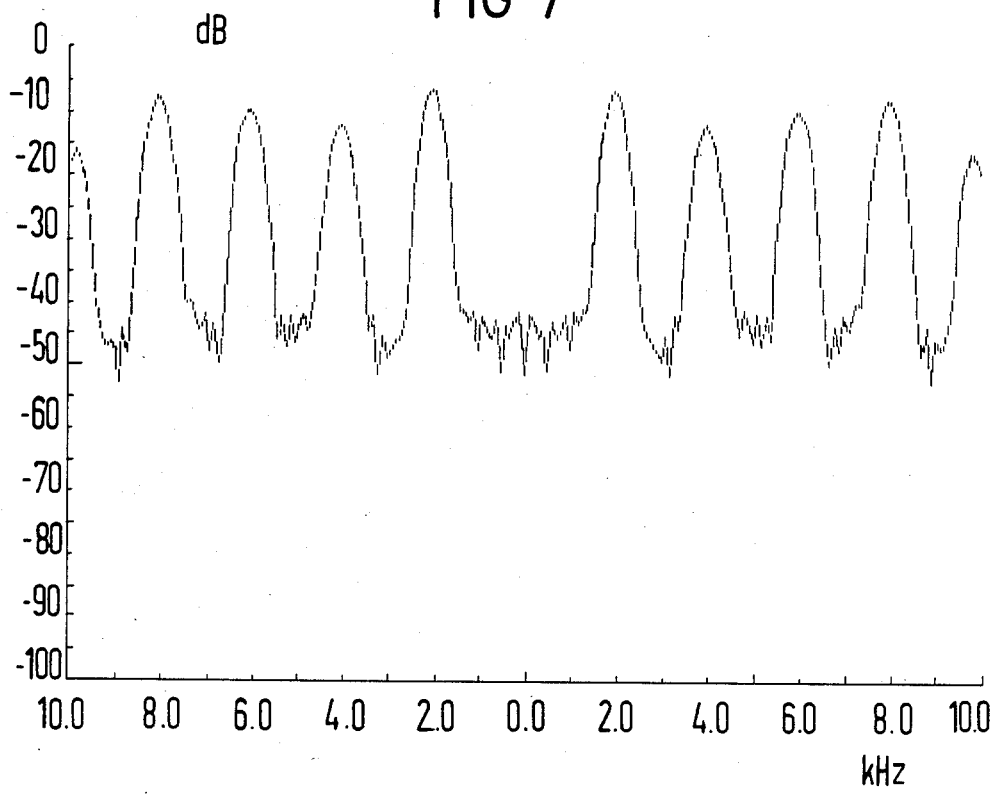
Figure 7:
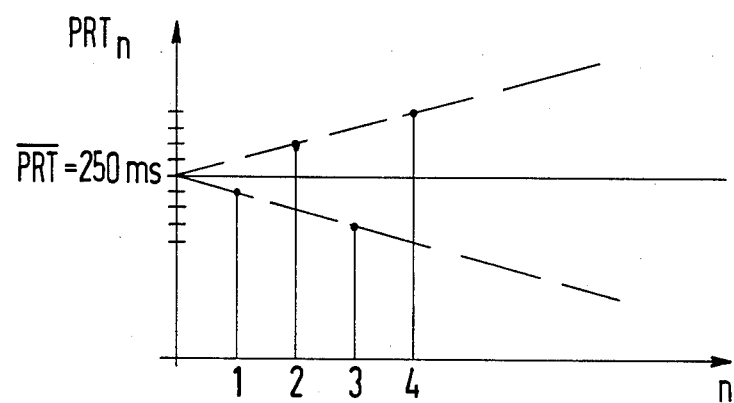

Two comb-like filter transfer functions are shown in FIGS. 6 and 7 respectively based on the examples employing an ordered staggering shown in FIGS. 3 and 4. The transfer functions are derived from a modified coherent integration of sixteen pulses. Both transfer functions are based on a mean pulse repetition frequency PRF of 4 kHz with a corresponding pulse repetition period PRT=250 microseconds.

The values for the staggering of the pulse repetition periods are shown in FIG. 6 below the transfer function. As can be seen in FIG. 6, the periods of successive sampling pulses alternate between two values $\frac{2}{3} \cdot \overline{PRT}$ and $4/3 \cdot \overline{PRT}$. The mean value of any two successive pulse repetition periods assumes a constant value, namely 250 microseconds, and $\Delta T$ assumes the value $\frac{1}{3} \cdot \overline{PRT}$.

The phase reference for the signal values thus is achieved with a constant value $\Delta \phi = 2\pi \cdot f_0 \cdot \overline{PRT}$, wherein $f_0 = 2$ kHz is the center filter frequency for this example. Vectorial addition of the samples is enabled on the basis of the constant phase reference and clearly exhibits the comb-like structure transfer function. A further important feature of this transfer function is that the frequency range around the Doppler frequency 0 Hz is in the stop band, thus indication of a moving target is guaranteed within that range as a result thereof.

The transfer function shown in FIG. 7, based on a PRT staggering according to FIG. 4, is not restricted to the use of two different pulse repetition frequency, but can theoretically employ an arbitrarily large number. The essential feature of the staggering in the embodiment shown in FIG. 7 is, as in the embodiment shown in FIG. 6, that any two successive pulse repetition period pairs assume a constant mean value.

Calculation of a transfer function according to FIG. 7 is based on a change of the pulse repetition period $\Delta T$ with the value $\frac{1}{3} \cdot 1/16 \cdot \overline{PRT}$. The constant phase backing of the samples which is essential for the modified coherent integration again is $\Delta \phi = 2\pi \cdot f_0 \cdot \overline{PRT}$. The comb-like structure of the transfer function and the null in the region of the Doppler frequency 0 Hz can also be clearly seen in FIG. 7.

Although modifications and changes may be suggested by those skilled in the art it is the intention of the inventors to embody within the patent warranted hereon all changes and modifications as reasonably and properly come within the scope of their contribution to the art.

We claim as our invention:

1. A pulse Doppler radar system with variable pulse repetition frequency comprising:
   means for staggering the periods of pairs of successive received reflected pulses according to the dimensioning $n \cdot (\overline{PRT} + (-1)^n \cdot \Delta T)$ wherein n is the number of a particular pulse in a transmission sequence, $\overline{PRT}$ is the mean value for the periods of the pulses, and $\Delta T$ is a selected constant fraction of said mean value for the periods of the pulses;
   means for undertaking modified coherent integration of said received reflected pulses by vectorial addition thereof, said means for taking modified coherent integration including means for forming a mean value of the frequencies of said pairs of pulse repetition frequencies, which mean value is constant, and means for generating an indicator reference for the reflected pulses which is a constant value such that the phase condition for undertaking said coherent integration is satisfied after every second pulse repetition frequency.

2. A pulse Doppler radar system with variable pulse repetition frequency, comprising:
   means for staggering pairs of successive received reflected pulses according to the dimensioning $n \cdot (\overline{PRT} + n \cdot (-1)^n \cdot \Delta T)$ wherein n is the number of a particular pulse in a transmission sequence, $\overline{PRT}$ is the mean value for the periods of the pulses, and $\Delta T$ is a selected constant fraction of said mean value for the periods of the pulses; and
   means for undertaking modified coherent integration of said received reflected pulses by vectorial addition thereof, said means for undertaking modified coherent integration including means for forming a mean value of the frequencies of said pairs of pulse repetition frequencies, and means for generating an indicator reference for the reflected pulse which is a constant value such that the phase condition for undertaking said coherent integration is satisfied after every second pulse repetition frequency.

3. A pulse Doppler radar system with variable pulse repetition frequency, means for staggering the pulse repetition periods for said pulses, and means for undertaking modified coherent integration of received reflected pulses by vectorial addition thereof, said means forming a mean value of the frequencies of pairs of pulse repetition frequencies formed from successive received reflected pulses, which mean value is constant, and generating an indicator reference for the reflected pulses which is a constant value such that the phase condition for undertaking said coherent integration is satisfied after every second pulse repetition frequency, said means comprising a plurality of series-connected shift registers corresponding to the number of said pulses to be integrated, a plurality of multipliers respectively connected to the inputs of each of said shift registers and a multiplier connected to the output of a last shift register, each multiplier multiplying the input signal supplied thereto by a weighting factor of $e^{-j \cdot \omega_0 \cdot n \cdot \overline{PRT}}$ wherein $\omega_0$ is a center frequency, n is the number of reflected pulses in said sequence, $\overline{PRT}$ is the mean period duration for the pulse sequence, and an adder connected to the outputs of all of said multipliers for combining the outputs thereof.

4. A method for undertaking coherent integration at a phase condition of a series of received reflected pulses in a pulse Doppler radar system by vectorial addition of said pulses, comprising the steps of:
   staggering the periods of pairs of successive received reflected pulses according to the dimensioning $(\overline{PRT} + (-1)^n \Delta T)$ wherein n is the number of a particular pulse in a transmission sequence, $\overline{PRT}$ is the mean value for the periods of the pulses, and $\Delta T$ is a selected constant fraction of said mean value for the periods of the pulses;
   generating a mean value of the frequencies of said pairs of successive received reflected pulses, which is constant; and
   generating an indicator reference for the reflected pulses which is a constant value such that the phase condition for undertaking said coherent integration is satisfied after every second pulse repetition frequency.

5. A method for undertaking coherent integration at a phase condition of a series of received reflected pulses in a pulse Doppler radar system, comprising the steps of:
   staggering the periods of pairs of successive received reflected pulses according to the dimensioning $n \cdot (\overline{PRT} + n \cdot (-1)^n \cdot \Delta T)$ wherein n is the number of a particular pulse in a transmission sequence, $\overline{PRT}$ is the mean value for the periods of the pulses, and $\Delta T$ is a selected constant fraction of said mean value for the periods of the pulses;
   generating a means value of the frequencies of said pairs of successive received reflected pulses, which mean value is constant; and
   generating an indicator reference for the reflected pulses which is a constant value such that the phase condition for undertaking said coherent integration is satisfied after every second pulse repetition frequency.

6. A method for undertaking coherent integration at a phase condition of a series of received reflected pulses in a pulse Doppler radar system by vectorial addition of said pulses, comprising the steps of:
   generating a mean value of the frequencies of pairs of successive received reflected pulses, which mean value is constant; and generating an indicator reference for the reflected pulses which is a constant value such that the phase condition for undertaking said coherent integration is satisfied after every second pulse repetition frequency by the steps of:
   entering each of the successively received reflected pulses in a plurality of series-connected shift registers, said plurality of shift registers being the same as the number of pulses to be integrated,
   tapping the input to each of said shift registers and the output of a last of said shift registers,
   supplying the tapped signals to a plurality of multipliers,
   multiplying said tapped signal in each of said multipliers by a weighting factor of $e^{-j \cdot \omega_0 \cdot n \cdot \overline{PRT}}$ wherein $\omega_0$ is a center frequency n is the number of the reflected pulses in said sequence, and $\overline{PRT}$ is the mean period duration for the pulse sequence,
   adding the outputs of said multipliers.

* * * * *